United States Patent Office 3,416,710
Patented Dec. 17, 1968

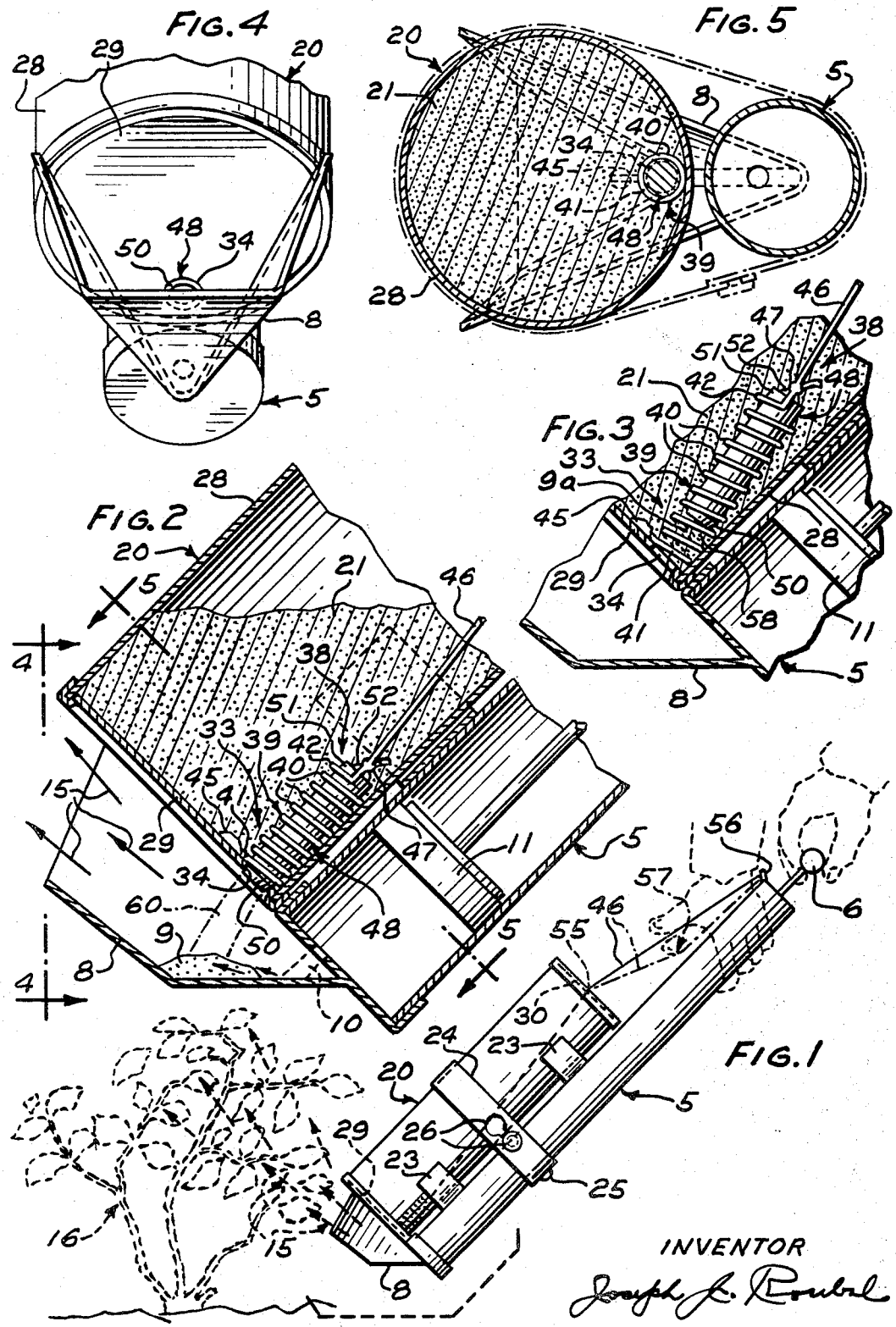

3,416,710
STOP AND FEED APPARATUS
Joseph J. Roubal, 5135 W. 22nd Place,
Cicero, Ill. 60650
Continuation-in-part of application Ser. No. 563,633,
June 30, 1966. This application Aug. 8, 1966, Ser.
No. 570,869
1 Claim. (Cl. 222—230)

ABSTRACT OF THE DISCLOSURE

Apparatus that operates to stop granular or powder substance from passing through an outlet opening and which apparatus permits controlling to feed through the outlet opening of varying size quantities of the granular or powder substance.

---

This invention relates more particularly to stop and feed apparatus for granular or powder substance—it being a specific form of the invention more broadly claimed in my co-pending application Ser. No. 563,633, filed June 30, 1966, now Patent No. 3,330,064, of which this application is a continuation in part.

It is the principal object of the invention to provide stop and feed apparatus that operates to stop granular or powder substance as such is housed in a container from passing through an outlet opening and which apparatus permits controlling in a simple manner and at a distance to feed through the outlet opening of varying size quantities of the granular or powder substance.

The foregoing and other objects in view are realized in practicing and use of the invention consisting of the novel combination and arrangement of parts hereinafter more specifically described and illustrated in the accompanying drawings. However, it is understood that the invention is not limited to the specific form as is disclosed herein.

In the drawings,

FIG. 1 is a side elevational view of plant dusting apparatus illustrated in use and which utilizes stop and feed apparatus constructed in accordance with the invention.

FIG. 2 is an enlarged longitudinal vertical section taken bottom wise fragmentarily of the stop and feed apparatus and showing here powder dust as such is stopped from moving through the outlet opening of the powder housing container.

FIG. 3 illustrates a controlled operated position to thereby realize an ejection and feeding through the outlet opening of a varying size quantity of the powder dust.

FIG. 4 is a section on 4—4 of FIG. 2.

FIG. 5 is a section on 5—5 of FIG. 2.

Referring to the drawings, as is disclosed in said co-pending application, Ser. No. 563,633, filed June 30, 1966, the dusting apparatus shown in FIG. 1, constitutes an elongated support provided by a pump cylinder 5 that is held, as indicated in dashed outline, by one hand of the operator in a downward direction at 45 degrees angular inclination generally, and the pump cylinder is operated by a handle 6, by the operator's other hand. A trough device 8 attached at the distal end of the cylinder provides an arrangement in which powder dust 9, in a restricted and ejected quantity, as is shown in FIG. 2, is expanded by a gust of air 10 thus when the handle 6 is abruptly or sharply pushed inward of the cylinder moving a piston 11. The powder dust when expanded in direct presence of the atmosphere, as is indicated by arrows at 15, is directed angularly upwardly, in the present instance, to dust more especially the under sides of leaves of a plant 16.

A container 20 that normally houses a larger quantity of the powder dust 21 (such being, in the present instance, an insecticide and/or fungicide) is attached to and carried by the elongated cylinder 5. Brackets 23 locate the container on the cylinder and an elastic 24 fixed at 25 and latched by an eyelet-button 26 suitably maintain the attachment.

The container may comprise any suitable construction and in the present instance is shown having a cylindrical vertical wall 28 and bottom and top walls 29 and 30. When not attached to the support cylinder 5 the container will stand on the bottom wall 29.

In use however the advantage is realized due to the container 20 being attached to the support cylinder 5, and which, as is described, is held by one hand of the operator in a downward direction generally at 45 degrees angular inclination, and which results, as is shown, that the container is also disposed at 45 degrees angular inclination generally.

In the arrangement, the container at the bottom wall 29 may rest, as is shown, topwise on the walls of the trough device 8. And therewith there is obtained a 45 degrees angular disposition of the walls 28 and 29 having, as is shown, an absolute low level bottom designated 33 and which is useful in that with least attention to such on the part of the operator the powder dust 21 in the container will permit constant availability.

Arranged in the container bottom wall 29 with respect to the low level bottom 33 is an outlet opening 34 which is restricted in size.

It is desirable that at the very low level bottom 33 the powder dust is effectively stopped and fed and ejected through the outlet opening 34. And provided to realize this is a spring coil and bolt arrangement 38 that operates in the powder dust 21.

As is shown, the spring coil and bolt arrangement 38 comprises a spring coil member 39 that is constituted by a plurality of spring coils 40. The spring coils are arranged concentrically and in spaced relation longitudinally and terminally provide a one end extremity coil 41 and an opposite end extremity coil 42. The spring coil member 39, it is understood, by means of the end extremity coil 41 is fixedly attached suitably at 45 to the container bottom wall 29 and thus wherein, as is shown, this extremity coil 41 is concentrically arranged as to the outlet opening 34. It should be understood, the spring coil member 39 due to the spring coils, and the involved arrangement, as is described, is springingly longitudinally contractile and therefore, it is understood, this spring coil member 39 is springingly longitudinally extendible thus being realized when a cord 46 attached at 47 at the opposite end extremity coil 42 is pulled, in a manner as will more clearly appear.

Arranged for axial sliding within the coils 40 is a bolt body 48. As is shown the bolt body has a free end 50 that is adapted to close the container wall outlet opening 34. And an opposite end 51 in the bolt body 48, as is shown at 52, is attached to the opposite end extremity coil 42 and which is, as is described, at the attached point 47 of the cord 46.

It is understood that since the spring coil member 39 is springingly longitudinally contractile that by this action the bolt body 48 at the free end 50 normally springingly closes the wall outlet opening 34 thereby stopping the powder dust from passing through this opening.

Attention is directed here to FIG. 1 showing that the cord 46 freely extends through an aperture 55 in the container wall 30 and is therewith suitably fixedly attached at 56 which is a distant end of the support cylinder 5. An operated position of the cord 46 is indicated, in dashed lines, at 57 and shows that at a distance, this cord has been pulled, as is shown, by depressing this cord by the thumb of the operator's same hand holding in the downward direction at 45 degrees inclination of the support cylinder 5.

A corresponding operated pulling of the cord 46 is shown in FIG. 3 and this shows that the spring coil member 39 in the coils 40 is springingly longitudinally extended.

As has been described, the bolt body 48 at the end 51 is also attached at the opposite end extremity spring coil 42 and due thereto in the spring longitudinal extension of the spring coil member 39 this bolt body 48 axially slides within the coils 40 and, as is shown in FIG. 3, is completely moved at the free end 50 from the container wall outlet opening 34 causing thereby that this opening becomes completely open. And therewith, it should be seen, an axially extending space 58 is realized between the container wall outlet opening 34 and the bolt body free end 50, and, as is described, due to the spring coil member 39 operating and being confined in the powder dust 21, an ejectable quantity of the powder dust designated **9*a*** is caused to occupy this realized axially extending space, as is shown.

It will be seen, a releasing by the operator's thumb from the position 57 of the cord 46, which annuls the pulling of the cord, thereby annuls the pulling to springingly longitudinally extend the spring coil member 39 and therewith, it should be seen, the bolt body 48 at the free end 50 engages the ejectable powder dust **9*a* and pushes and ejects the same out through the container outlet opening 34. In FIG. 2, the dashed lines 60** indicate the manner the powder dust is ejected.

It should be understood, the spring coil member 39, as is described, being springingly longitudinally extendible permits varying withdrawing of the bolt body 48 at the free end 50 to increase or decrease the axially extending space 58 in length, and, due thereto, a larger or smaller size quantity of the powder dust **9*a* may occupy the same to be pushed and ejected through the outlet opening 34, and which it should be seen, is under the operator's control depending on the extent his thumb depresses and thereby exerts pulling on the cord in the operating position 57. It should be understood, a larger or smaller size quantity of the powder dust is made available in the trough device 8** for dusting as of a single larger or smaller plant to thereby economically apply this powder dust.

There has been described above that the spring coil member 39 is longitudinally extendible because such is springingly contractile, and, it should be seen, that by the action of the spring coils 40 causing such, this obtains an agitation of the powder dust as normally tends to pack and settle with respect to the low level bottom 33. More pronounced agitation of the powder dust is obtained wherein, as is shown by FIGS. 2 and 3, the spring coil member 39 in attachment at 45, and as pulled by the cord 46, is angularly-axially pulled, as is shown.

What is claimed is:

1. Stop and feed apparatus comprising container means, said container means normally housing granular or powder substance that locates with respect to the bottom wall of the container means, spring coil means, said spring coil means constituting coils arranged concentrically and in spaced relation axially-longitudinally and terminally which provide a one end extremity coil and an opposite end extremity coil, said spring coil means by means of the one end extremity coil being fixedly attached to said container means bottom wall and thus wherein the one end extremity coil is concentric with respect to a restricted outlet opening arranged in said container means bottom wall, bolt means, said bolt means being arranged to axially slide substantially within the coils of said spring coil means, and said spring coil means by means of the opposite end extremity coil being attached to one end of said bolt means, and said spring coil means being springingly longitudinally contractile and whereby the spring coil means springingly urges said bolt means at its free end to close said container means outlet opening, and string means having one end attached to said spring coil means at said opposite end extremity coil and said string means being thereby attached to said bolt means, and said string means at its other end being adapted for pulling to cause when being pulled a spring longitudinal extension of the spring coil means and thereby to cause that said bolt means axially slides within the coils of said spring coil means, and in the pulling on said string means and involved sliding of the bolt means whereby the bolt means at its free end completely opens said container means outlet opening and therewith is realized an axially extending space between the bolt means at its free end and said container means outlet opening, and by the presence in said container means of the granular or powder substance which said axially extending space becomes occupied by an ejectible quantity of the granular or powder substance, and when pulling on said string means is annulled whereby due to said spring coil means as such is springingly longitudinally contractile said bolt means at its free end engages said ejectible quantity of the granular or powder substance and causes to push and eject the same through said container means outlet opening.

References Cited

UNITED STATES PATENTS

| | | | |
|---|---|---|---|
| 334,934 | 1/1886 | Campbell | 43—147 |
| 645,028 | 3/1900 | Barber | 43—147 |
| 572,907 | 12/1896 | Norton | 43—147 |
| 2,223,854 | 12/1940 | Peaster | 222—518 X |
| 3,330,064 | 7/1967 | Roubal | 43—147 |

SAMUEL F. COLEMAN, *Primary Examiner.*

N. L. STACK, *Assistant Examiner.*

U.S. Cl. X.R.

222—194, 246, 409, 518; 251—294, 321